UNITED STATES PATENT OFFICE.

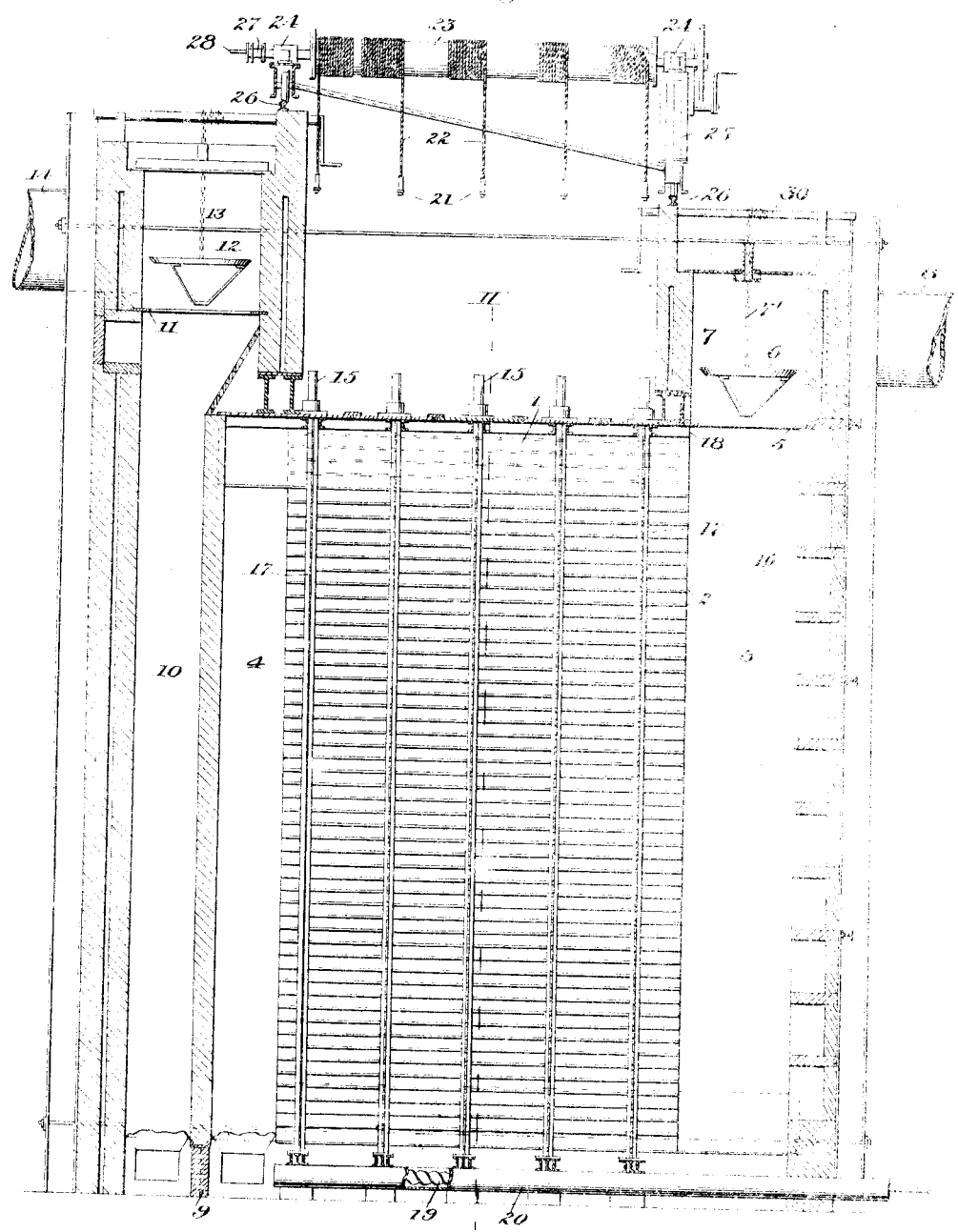

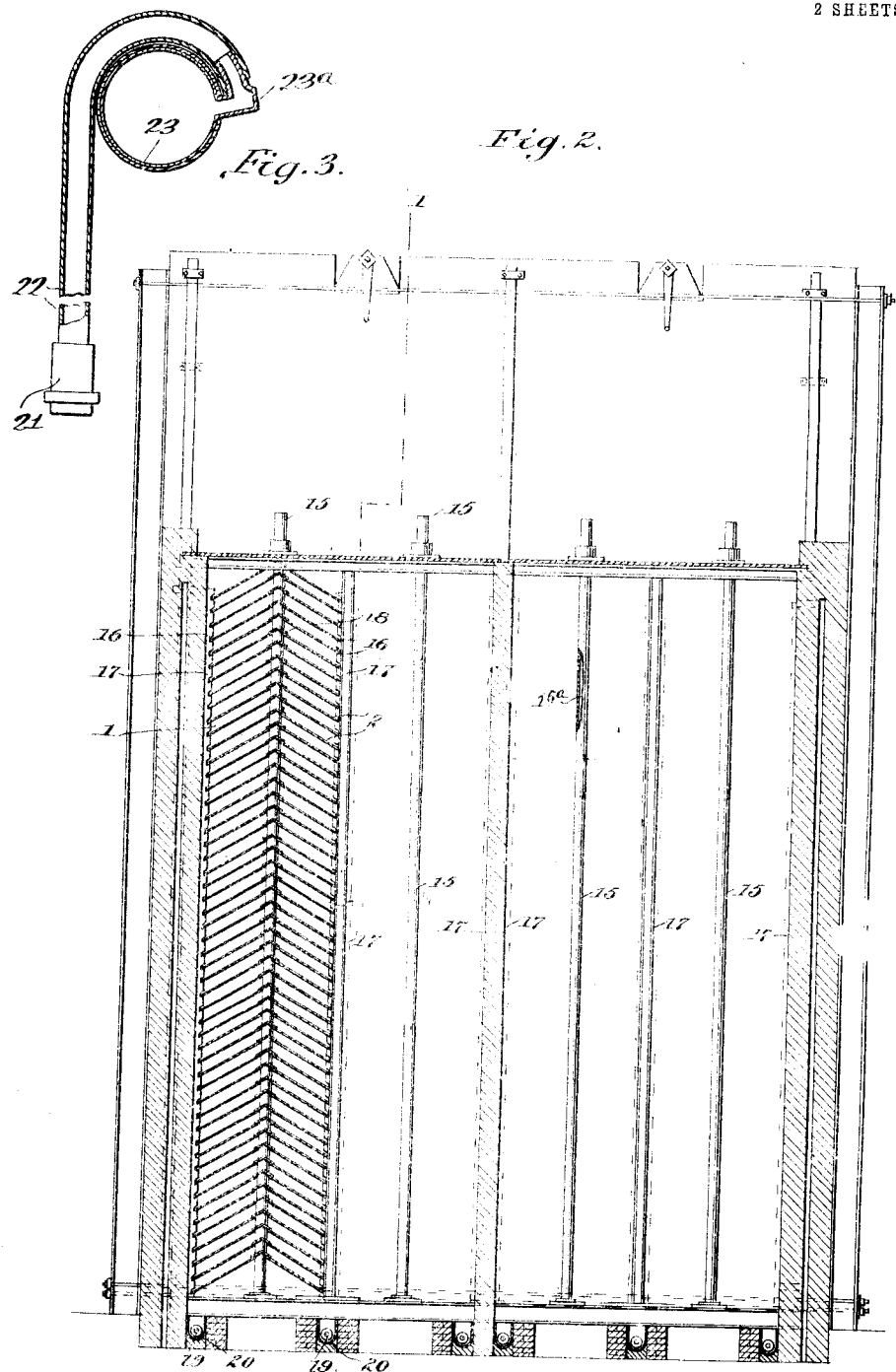

HENRY HOWARD, OF BOSTON, MASSACHUSETTS.

DUST-SEPARATOR.

1,071,234. Specification of Letters Patent. Patented Aug. 26, 1913.

Application filed December 5, 1911. Serial No. 664,083.

*To all whom it may concern:*

Be it known that I, HENRY HOWARD, a citizen of the United States, residing at Boston, in the county of Suffolk and State of Massachusetts, have invented certain new and useful Improvements in Dust-Separators, of which the following is a specification.

In my United States Letters Patent No. 970,053 and Reissue No. 13,090, I have described and claimed a method of and apparatus for separating dust from gases, in which a current of the dust-laden gases is evenly subdivided between and caused to pass at low velocity through the interspaces of a tier of parallel dust-retaining shelves, the dust settling out upon the shelves and being thence removed at intervals by a scraper, blast- or suction-pipe or other means.

According to the present invention, I utilize the principle set forth in my specified patents, but provide inclined dust-retaining shelves and means for intermittently vibrating the shelves to cause the accumulated dust to slide down them and drop into a common receptacle below.

The preferred construction is shown in the accompanying drawings, in which—

Figure 1 is a vertical longitudinal section of the separator on the line I—I of Fig. 2; Fig. 2 is a vertical transverse section of the separator on the line II—II of Fig. 1; and Fig. 3 is a section of the drum and compressed-air pipe, showing one style of coupling the pipe to the drum.

The apparatus illustrated comprises parallel rectangular chambers 1—1, each of which contains four tiers of superposed parallel shelves 2. At one end of each chamber 1 is a vertical gas-supply passage 3, opening into the spaces between all of the shelves in this chamber, and at the other end is a vertical gas-discharge passage 4. At the upper end of the supply-passage 3 is a gas-inlet 5, controlled by a valve 6, suspended by chain 7', and which may be raised or lowered by the windlass 30. Above the valved inlets 5 of the two chambers 1 is a horizontal passage 7, to which the dust-laden gases are supplied by a pipe 8. At the lower end of the discharge passage 4 is an outlet 9, which delivers the effluent gases into an uptake 10, having an outlet 11 controlled by a valve 12. A horizontal passage 13 having a delivery pipe 14 extends over the outlets 11 of both chambers.

In operation, the valves 6, 12 are opened and dust-laden gases supplied through the pipe 8 pass into the horizontal chamber 7 and thence through the openings 5 into the passages 3. The gases then subdivide and pass between the shelves 2, whereon the dust is deposited. The gases leaving the shelves enter the discharge-passages 4 and escape through the openings 9, uptakes 10, openings 11, horizontal passage 13 and pipe 14. When heated gases and fumes are supplied to the separator, for example those from metallurgical furnaces, the introduction of the heated gases into the upper ends of the vertical passages 3 and the withdrawal of the purified and somewhat cooler gases from the lower end of the vertical passages 4 automatically effect a uniform distribution of the gases between the spaces, because if the gases tend to flow too rapidly through the upper interspaces, the vertical column of gas in the discharge-passage acquires a relatively higher temperature and lower specific gravity, and thereupon effects a back-pressure and retards the movement of the gases between the upper shelves.

The general construction and mode of operation thus far described are common to my earlier specified patents. The present invention relates to the arrangement of the shelves and to means for intermittently vibrating them to remove the accumulated dust therefrom. In my earlier apparatus, the shelves are horizontal and stationary and the dust is mechanically scraped, blown or sucked off from their surfaces. According to my present invention the shelves 2 are transversely inclined and are carried by supports which permit them to be vibrated. When dust has accumulated on the shelves to a certain depth, the shelves of each tier are simultaneously agitated by suitable mechanism, and the layers of dust are thereby caused to slip off the shelves and to fall from their lower edges into a receptacle at the bottom of the tier. In the apparatus illustrated, each chamber 1 is provided with four tiers of shelves 2, the shelves of each pair of adjacent tiers being inclined downward from a common intermediate support and vibrator. Fig. 2 illustrates in detail one of these pairs of tiers of inclined shelves, the upper edges of which rest against and are supported upon a number of vertical metal tubes 15. The shelves slope downward in opposite directions from these tubes 15, and their lower edges are loosely received in and supported by notches 16 in a number of vertical metal bars 17. A longitudinal angle-plate 18 is supported upon the adjacent edges of each pair of plates, covering the spaces between them and having openings to receive the pipes 15. The lower edges of the plates of each tier are spaced away from the lower edges of the plates of the adjacent tier, or adjacent wall, by the bars 17. Vertical longitudinal spaces, of a width equal to that of the un-notched portion of the bars, are thus provided, through which the dust discharged from the shelves can fall into longitudinal receptacles beneath. I have shown such a receptacle 20 beneath the lower edges of each tier of shelves, and a screw-conveyer 19 in each for discharging the dust through one end-wall of the separator. The upper ends of the tubes 15 are open, to receive devices for vibrating the tubes and thereby the shelves. The vibrating means illustrated comprise a number of pneumatic hammers 21 of the type commonly used to knock the scale off the outside of boiler-tubes. These hammers have a piston-actuated piece which vibrates transversely, striking the walls of the tube. Five vertical tubes 15 are shown supporting each pair of shelf-tiers, and five hammers are provided, suspended by flexible compressed-air pipes 22 from a hollow drum 23, in line with the tubes. The upper ends of the tubes 22 are connected with the chamber of the drum by couplings 23ª thereon, and this drum acts as a supply-reservoir for compressed air. The drum is journaled in the bearings 24 of a truck 25 which runs on rails 26 at the top of the structure. One trunnion 27 of the drum is hollow and receives one end of a movable compressed-air supply-pipe 28, entering through a stuffing-box.

In order to remove the accumulated dust from the shelves of either chamber, the valves 6, 12 of this chamber are closed, the truck carrying the drum 23 is wheeled over one set of tubes 15 and is turned to unwind the flexible pipes 22 and drop the hammers 21 into the tubes 15. Compressed air is supplied and the hammers knocking upon the tubes 15 vibrate the shelves and cause the dust to slip therefrom into the vertical spaces, wherein it falls into the receptacles 20, to be delivered by the screw-conveyers 19. The drum is then rotated to raise the hammers out of this set of tubes, the truck is moved over the other set of tubes 15 of the same chamber, and the hammers are dropped therein and vibrated, thus clearing the dust from the other two tiers of shelves in this chamber.

It will be understood that electric or other equivalent means may be used to support and vibrate the shelves, instead of the tubes 15 and pneumatic hammers.

I claim:

1. A dust-separator, comprising a chamber containing superposed transversely inclined dust-retaining shelves, means for passing dust-laden gases between said shelves, and means for vibrating the shelves to discharge the accumulated dust therefrom.

2. A dust-separator, comprising a chamber containing superposed transversely inclined dust-retaining shelves, vertical gas-inlet and outlet passages at the opposite ends of said shelves, a vertical dust-receiving passage communicating with the lower ends of said shelves, and means for vibrating said shelves.

3. A dust-separator, comprising a chamber containing superposed inclined dust-retaining shelves, means for passing dust-laden gases between said shelves, a vertical support for said shelves, and means for vibrating said support and thereby the shelves.

4. A dust-separator, comprising a chamber containing superposed inclined dust-retaining shelves, means for passing dust-laden gases between said shelves, a vertical tubular support for said shelves, and means constructed to enter and vibrate said support and thereby the shelves.

5. A dust-separator, comprising a series of superposed inclined dust-retaining shelves, means for passing dust-laden gases between said shelves, a series of vertical supports for said shelves, and means for simultaneously vibrating said supports.

6. A dust-separator, comprising a plurality of tiers of superposed inclined dust-retaining shelves, means for passing dust-laden gases between said shelves, series of vertical tubular supports for different tiers of shelves, and a movable set of devices adapted to enter and vibrate any series of supports and the shelves carried thereby.

7. A dust-separator, comprising a plurality of tiers of superposed inclined dust-retaining shelves, means for passing dust-laden gases between said shelves, series of vertical tubular supports for different tiers of shelves, a series of pneumatic hammers adapted to enter and vibrate any series of supports, and a movable compressed-air drum having flexible depending air-pipes carrying said hammers.

8. A dust-separator comprising a chamber containing closely-spaced, superposed, inclined, dust-retaining shelves, means for passing gases of super-atmospheric temperature therethrough, means for vibrating the shelves, and means for automatically regulating the passage of the gases to secure substantial uniformity of flow between the shelves.

9. A dust-separator, comprising a chamber containing superposed inclined dust-retaining shelves, means for vibrating said shelves, passages at the opposite ends of said shelves, an inlet at the upper end of one passage, and an outlet at the lower end of the other passage, whereby a substantial uniformity of flow is secured between the shelves above the outlet.

10. A dust-separator, comprising a plurality of chambers each containing superposed inclined dust-retaining shelves, means for passing dust-laden gases between said shelves, and means for isolating each chamber and vibrating the shelves therein to discharge the accumulated dust therefrom.

11. A dust-separator, comprising a plurality of chambers, each containing closely spaced, superposed, inclined, dust-retaining shelves, means for passing gases of superatmospheric temperature therethrough, means for automatically regulating the passage of the gases to secure substantial uniformity of flow between the shelves, and means for isolating each chamber and vibrating the shelves therein to discharge the accumulated dust therefrom.

12. A dust collector comprising a chamber, having a gas inlet and an outlet, containing a plurality of series, in zigzag arrangement, of closely spaced, superposed, dust retaining shelves, inclined transversely to the direction of flow of the gas, rods supporting the contiguous upper ends of the plates of adjacent series, said rods communicating with the outside of the chamber so that vibrations from an external source may be transmitted therethrough to the plates for dislodging dust accumulated thereon, and a support for the lower ends of the plates of adjacent series, separating said series and thereby forming an alley way toward which the plates slope, said support constituting a partition in said alley way to prevent the passage of gas therethrough.

In testimony whereof I affix my signature in presence of two witnesses.

HENRY HOWARD.

Witnesses:
EDWIN R. BOND,
W. B. KEITH.